United States Patent
Kuroda et al.

(10) Patent No.: US 11,910,816 B2
(45) Date of Patent: Feb. 27, 2024

(54) METHOD FOR MANUFACTURING INSTANT NOODLES

(71) Applicant: NISSIN FOODS HOLDINGS CO., LTD., Osaka (JP)

(72) Inventors: Yu Kuroda, Osaka (JP); Toshio Yoshinuma, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 277 days.

(21) Appl. No.: 16/970,592

(22) PCT Filed: Jan. 21, 2019

(86) PCT No.: PCT/JP2019/001595
§ 371 (c)(1),
(2) Date: Aug. 17, 2020

(87) PCT Pub. No.: WO2019/163352
PCT Pub. Date: Aug. 29, 2019

(65) Prior Publication Data
US 2021/0112835 A1    Apr. 22, 2021

(30) Foreign Application Priority Data
Feb. 20, 2018  (JP) .................. 2018-028216

(51) Int. Cl.
A23L 7/113 (2016.01)
(52) U.S. Cl.
CPC ..................... A23L 7/113 (2016.08)
(58) Field of Classification Search
CPC ....................................... A23L 7/113
USPC ........................................ 426/451
See application file for complete search history.

(56) References Cited

U.S. PATENT DOCUMENTS

| | | | |
|---|---|---|---|
| 4,963,387 A | 10/1990 | Nakagawa et al. | |
| 2009/0047396 A1 | 2/2009 | Ikeda | |
| 2011/0318466 A1 | 12/2011 | Nagayama | |
| 2014/0328991 A1 | 11/2014 | Kobayashi et al. | |
| 2020/0093160 A1 | 3/2020 | Abe et al. | |
| 2020/0093161 A1 | 3/2020 | Abe et al. | |

FOREIGN PATENT DOCUMENTS

| | | |
|---|---|---|
| EP | 0291980 | 11/1988 |
| EP | 0294692 | 12/1988 |
| JP | S64-027447 | 1/1989 |
| JP | S64-063332 | 3/1989 |
| JP | H06-000064 | 1/1994 |
| JP | H06-113802 | 4/1994 |
| JP | 2002-027930 | 1/2002 |
| JP | 2004-242571 | 9/2004 |
| JP | 2008-054661 | 3/2008 |
| JP | 4644298 | 3/2011 |
| JP | 4761534 | 8/2011 |
| JP | 2015-057979 | 3/2015 |
| JP | 2015-084772 | 5/2015 |
| JP | 2015-213434 | 12/2015 |
| JP | 2017-175923 | 10/2017 |
| RU | 2456804 C1 | 7/2012 |
| RU | 2501316 C2 | 12/2013 |
| WO | 2013/047201 | 4/2013 |
| WO | 2018/043448 | 3/2018 |
| WO | 2018/043449 | 3/2018 |

OTHER PUBLICATIONS

Oda, Monta, "Thebook on new noodle", 4th edition, Tokyo: Shokuhinsangyo Shimbunsha Co., Ltd., 1994, pp. 27-30, 131-133; A concise explanation of relevance provided in the attached International Search Report and Written Opinion.
Ojima, Asami, "About 'potassium lactate' that is a new food additive", New Food Industry, 2015, vol. 57, No. 12, pp. 11-16 A concise explanation of relevance provided in the attached International Search Report and Written Opinion.
International Search Report and Written Opinion issued for PCT/JP2019/001595, dated Apr. 9, 2019, 17 pages including English translation.
Office Action issued for Russian Patent Application No. 2020127551, dated Apr. 27, 2022, 12 pages including English translation.
Office Action issued for Japanese Patent Application No. 2018-028216, dated Jul. 27, 2021, 8 pages including machine translation.
Office Action issued for Chinese Patent Application No. 201980013987.1, dated Dec. 15, 2023, 10 pages including machine translation.

*Primary Examiner* — Subbalakshmi Prakash
(74) *Attorney, Agent, or Firm* — Hamre, Schumann, Mueller & Larson, P.C.

(57) ABSTRACT

An object of the present invention is to provide a method for manufacturing instant noodles, wherein the instant noodles are excellent in the noodle-making property, texture and salty taste, and sodium is reduced. In the manufacture of the instant noodles, in order to reduce the amount of salt used for manufacturing noodles, 0.5 to 1.5 g of potassium lactate is substituted for 1 g of salt to be added to kneading water to manufacture the noodles, and the instant noodles can be thereby manufactured which are excellent in the noodle-making property, texture and salty taste.

3 Claims, No Drawings

METHOD FOR MANUFACTURING INSTANT NOODLES

TECHNICAL FIELD

The present invention relates to a method for manufacturing instant noodles in which the sodium content is reduced.

BACKGROUND ART

Many so-called low-salt goods, in which the sodium content is reduced for preventing high blood pressure, have been marketed in recent years. In the "Dietary Reference Intakes for Japanese" of the 2010 fiscal year edition from the Ministry of Health, Labour and Welfare, the target value of daily salt intake for an adult man is less than 9 g, and that for an adult woman is less than 7.5 g. In the "Dietary Reference Intakes for Japanese" of the 2015 fiscal year edition, however, the target value of daily salt intake for an adult man is less than 8 g, and that for an adult woman is less than 7 g. It is considered that since the respective target values of daily salt intake have decreased, a preference for salt reduction will increase further from now on.

As techniques for reducing salt in noodles, for example, Patent Literatures 1 to 4 are disclosed.

Patent Literature 1 describes udon noodles, containing wheat flour, a thickener composition and water, wherein the udon noodles contain xanthan gum, roast bean gum, and guar gum as the thickener composition, in a technique for udon noodles having enough elasticity even though the amount of salt added is smaller than conventional.

Patent Literature 2 describes a technique for noodle making using arginine or an arginine salt mixed in wheat flour for manufacturing salt-free or low-salt Chinese noodles.

Patent Literature 3 describes noodles containing either or both of isomaltulose and reduced isomaltulose and a method for manufacturing the noodles as noodles with a reduced or zero content of sodium salts, especially salt and sodium carbonate is and a method for manufacturing the noodles.

Patent Literature 4 describes a method for manufacturing noodles using magnesium chloride contained in bittern as a technique for manufacturing salt-free noodles without adding salt.

CITATION LIST

Patent Literature

Patent Literature 1: Japanese Patent Laid-Open No. 2015-84772
Patent Literature 2: Japanese Patent Laid-Open No. 2015-213434
Patent Literature 3: Japanese Patent No. 4644298
Patent Literature 4: Japanese Patent No. 4761534

SUMMARY OF INVENTION

Technical Problem

An object of the present invention is to provide a method for manufacturing instant noodles, wherein the instant noodles are excellent in the noodle-making property, texture and salty taste, and sodium is reduced.

Solution to Problem

The present inventors have found a method for manufacturing instant noodles, wherein the noodles can be made satisfactorily even when the amount of salt used for kneading water of the noodles is reduced, and wherein the instant noodles also have good texture and salty taste, and completed the present invention.

More specifically, the present invention is a method for manufacturing instant noodles, wherein an amount of salt used for manufacturing the noodles is reduced, and herein 0.5 to 1.5 g of potassium lactate is substituted for 1 g of salt to be added to kneading water to manufacture the noodles.

Advantageous Effects of Invention

According to the present invention, a method for manufacturing instant noodles, wherein the instant noodles are excellent in the noodle-making property, texture and salty taste, and wherein sodium is reduced can be provided.

DESCRIPTION OF EMBODIMENTS

The present invention will be described in detail hereinafter. However, the present invention is not limited to the following description.

1. Raw Material Formulation

Examples of main raw material powders used for manufacturing instant noodles according to the present invention include farina such as wheat flour (including durum wheat flour), buckwheat flour, barley flour, and rice flour, and various types of starch such as potato starch, tapioca starch and corn starch. These may be used alone or as a mixture. As the starch, raw starch, gelatinized starch, modified starch such as acetylated starch, etherified starch and crosslinked starch, and the like can also be used.

As other sub materials, salt, alkaline agents, phosphates, various thickeners, noodle quality modifiers, edible fats or oils, pH adjusters, various dyes such as carotene dye, preservatives, and the like commonly used in the manufacture of fried noodles can be added in the present invention. These may be added together with the main raw material powders, or may be added as a solution or a dispersion in kneading water.

On that occasion, salt is usually added to kneading water for improving the flavor and the noodle-making property of noodles in the manufacture of noodles. Although the amount of salt added varies depending on the type of desired noodles, around 1 to 5% by weight is mainly used based on 1 Kg of main raw material powder. When the amount of salt in noodles is reduced, the salty taste and the noodle-making property of noodles are poor if the amount of salt added to kneading water is reduced.

Therefore, in the present invention, in order to reduce the amount of salt to be added to kneading water, 0.5 to 1.5 g of potassium lactate is substituted for 1 g of salt to be reduced, and added. Even though the amount of salt is reduced, instant noodles having an enough noodle-making property and good texture and salty taste can be manufactured by adding potassium lactate. If less than 0.5 g of potassium lactate is added and salt reduction is large, the salty taste deteriorates, the dough is lacking in extensibility, the noodles are lacking in viscoelasticity, and an enough noodle-making property and the texture with elasticity are hardly obtained. Conversely, if more than 1.5 g of potassium lactate is added and salt reduction is large, it not only influences the salty taste of the noodles but also increases a water absorbing property to soften the noodles at the time of cooking. The amount of potassium lactate is preferably 0.5 to 1.0 g, and more preferably 0.75 to 1.0 g per 1 g of salt to be reduced.

Even though the whole amount of salt to be added to kneading water is excluded, instant noodles having a good noodle-making property, good texture and good salty taste can be manufactured. However, salt is necessary to some extent to obtain flavor closer to salty taste derived from salt, and potassium lactate is preferably substituted for 20 to 50% by weight of salt based on the total amount of salt to be added to kneading water.

2. Kneading Step

A method for manufacturing noodle dough (dough) according to the present invention may be performed in accordance with an ordinary method. More specifically, noodle material powder and kneading water may be kneaded so that the noodle material powder and the kneading water are homogeneously mixed with a batch mixer, a flow jet mixer, a vacuum mixer, or the like, and crumbly dough may be manufactured.

3. Noodle-Making Step

Subsequently, noodle strings are manufactured from the manufactured dough. The manufacturing method may be performed according to an ordinary method, and examples of the manufacturing method include a method in which the dough is formed into crude noodle belts with a roll, the crude noodle belts are compounded or the like into a noodle belt, the noodle belt is further rolled out a plurality of times with a roll and thinned down to a predetermined noodle belt thickness, and the noodle belt are cut out with a cutting-out roll called a cutting blade to manufacture noodle strings. Noodle strings may be manufactured by extrusion with an extruder. A noodle belt may be manufactured using an extruder in the same way, and the noodle belt may then be rolled out and cut out. A plurality of noodle belts may be combined to manufacture a noodle belt having a multilayer structure, and the noodle belt may then be rolled out and cut out.

4. Steaming Step

The raw noodle strings obtained at the noodle-making step are steamed in accordance with an ordinary method if needed to gelatinize the noodle strings. Since preferable steaming conditions vary depending on the type of noodles and the thickness of noodles, preferable conditions may be suitably set so that the conditions suit to target texture. As the steaming method, the noodle strings can also be heated not only by boiling or with saturated water vapor but also with superheated water vapor, and moisture supplying steps such as showering and dipping can also be combined. Liquid seasoning and a loosening agent may be applied to the noodles steamed by showering or dipping if needed.

5. Drying Step

The noodle strings are cut into one meal amount and weighed. A container for drying called a retainer is filled with the noodle strings, and then dried. In the case of fried noodles, the noodle strings are fry dried by dipping the noodle strings into frying oil. The fried noodles are preferably fry dried at a frying oil temperature of 140 to 160° C. The fried noodles may be dried so that the content of moisture after drying is 1.5 to 5% by weight.

In a method for drying non-fried noodles, non-fried noodles may be dried by a well-known method such as hot-air drying, high-temperature hot-air drying, superheated steam drying and microwave drying. Methods for drying by hot air such as hot-air drying and high-temperature hot-air drying are common, and non-fried noodles are preferably dried under the conditions of a drying temperature of 60 to 150° C. and a wind speed of 1 to 70 m/s. The drying step may be performed in combination of a plurality of conditions, and non-fried noodles may be dried so that the content of moisture after drying is 14.5% by weight or less.

As mentioned above, substitution of 0.5 to 1.5 g of potassium lactate for 1 g of salt to be added to kneading water to manufacture noodles can provide a method for manufacturing instant noodles, wherein the instant noodles are excellent in the noodle-making property, texture and salty taste, and sodium is reduced.

EXAMPLES

The present embodiments will be described in further detail by giving the following Examples.

<Experiment 1: As to the Amount of Salt Reduced and the Amount of Potassium Lactate Added>

Test Example 1

Kneading water obtained by dissolving 20 g of salt, 3 g of phosphate, and 4 g of polyphosphate in water and diluting up the mixture to 380 ml was added to 1 kg of main raw material powder comprising 800 g of wheat flour and 200 g of acetylated tapioca starch, and the mixture was mixed with a normal pressure mixer for 15 minutes to manufacture noodle dough (dough).

The manufactured dough was formed into crude noodle belts with a roll, and the crude noodle belts were compounded to manufacture a noodle belt. The manufactured noodle belt was rolled out with a roll so that the final noodle belt thickness was 0.85 mm. The noodle belt was cut with a #12 square cutting blade roller to form noodle strings.

Subsequently, the noodle strings were steamed in a steam chamber in which saturated steam at 270 kg/h was introduced for 2 minutes, and the noodle strings were gelatinized.

The gelatinized noodle strings were dipped into liquid seasoning obtained by dissolving 50 g of salt and 10 g of sodium glutamate in water, and diluting up the mixture to 1 L, cut into lengths of about 30 cm and then divided into 95-g portions which are each for one meal. A retainer for fries (container) was filled therewith, and the noodle strings were dried at 145° C. for 2 minutes and 10 seconds to obtain a fried noodle sample (udon) with a moisture content of 3% by weight.

Test Example 2

A fried noodle sample (udon) was manufactured by the method of Test Example 1 except that the amount of salt added to kneading water was 15 g.

Test Example 3

A fried noodle sample (udon) was manufactured by the method of Test Example 1 except that the amount of salt added to kneading water was 15 g, and the amount of 78% potassium lactate added was 3.2 g (equivalent to 2.5 g of potassium lactate).

Test Example 4

A fried noodle sample (udon) was manufactured by the method of Test Example 1 except that the amount of salt added to kneading water was 15 g, and the amount of 78% potassium lactate added was 6.4 g (equivalent to 5 g of potassium lactate).

Test Example 5

A fried noodle sample (udon) was manufactured by the method of Test Example 1 except that the amount of salt added to kneading water was 15 g, and the amount of 78% potassium lactate added was 9.6 g (equivalent to 7.5 g of potassium lactate).

Test Example 6

A fried noodle sample (udon) was manufactured by the method of Test Example 1 except that the amount of salt added to kneading water was 10 g.

Test Example 7

A fried noodle sample (udon) was manufactured by the method of Test Example 1 except that the amount of salt added to kneading water was 10 g, and the amount of 78% potassium lactate added was 6.4 g (equivalent to 5 g of potassium lactate).

Test Example 8

A fried noodle sample (udon) was manufactured by the method of Test Example 1 except that the amount of salt added to kneading water was 10 g, and the amount of 78% potassium lactate added was 9.6 g (equivalent to 7.5 g of potassium lactate).

Test Example 9

A fried noodle sample (udon) was manufactured by the method of Test Example 1 except that the amount of salt added to kneading water was 10 g, and the amount of 78% potassium lactate added was 12.8 g (equivalent to 10 g of potassium lactate).

Test Example 10

A fried noodle sample (udon) was manufactured by the method of Test Example 1 except that the amount of salt added to kneading water was 10 g, and the amount of 78% potassium lactate added was 19.2 g (equivalent to 15 g of potassium lactate).

Test Example 11

A fried noodle sample (udon) was manufactured by the method of Test Example 1 except that the amount of salt added to kneading water was 5 g.

Test Example 12

A fried noodle sample (udon) was manufactured by the method of Test Example 1 except that the amount of salt added to kneading water was 5 g, and the amount of 78% potassium lactate added was 9.6 g (equivalent to 7.5 g of potassium lactate).

Test Example 13

A fried noodle sample (udon) was manufactured by the method of Test Example 1 except that the amount of salt added to kneading water was 5 g, and the amount of 78% potassium lactate added was 19.2 g (equivalent to 15 g of potassium lactate).

Test Example 14

A fried noodle sample (udon) was manufactured by the method of Test Example 1 except that the amount of salt added to kneading water was 5 g, and the amount of 78% potassium lactate added was 28.8 g (equivalent to 22.5 g of potassium lactate).

The noodle-making property of the noodles of each Test Example Number and the texture and salty taste of the noodles after cooking were evaluated with Test Example 1 defined as a standard. A sample having the noodle-making property of the noodles as good as Test Example 1 was rated as ⊙. A sample having an almost good noodle-making property of the noodles was rated as ○. A sample having a poor noodle-making property but capable of machine noodle making was rated as Δ. A sample lacking in the noodle-making property and incapable of machine noodle making was rated as x.

In a cooking method, a noodle sample, powdered soup, and 380 ml of boiling water were placed in a cup-shaped foamed paper cup container which was then covered and left to stand for 3 minutes. The sample was then eaten, and the texture and the salty taste were evaluated. Five skilled panelists evaluated the samples. As to texture, a sample moderate in smoothness and elasticity and good as in Test Example 1 was rated as ⊙. A sample slightly weaker in smoothness and elasticity than in Test Example 1 but almost good was rated as ○. A sample weak in smoothness and elasticity and poor in texture was rated as Δ. A sample lacking in smoothness and elasticity and very poor in texture was rated as x. As to salty taste, a sample as good as in Test Example 1 was rated as ⊙. A sample slightly weaker in salty taste than in Test Example 1 or feeling harsh but almost good was rated as ○. A sample having weak salty taste or harshness and thus poor was rated as Δ. A sample without salty taste or having strong harshness and thus very poor was rated as x.

The following Table 1 describes the results of the noodle-making property and the sensory evaluation of each Test Example Number of Experiment 1.

| Test Example Number | Amount of salt added | Amount of salt reduced | Amount of potassium lactate added | Noodle-making property | Texture | Salty taste | Comment |
|---|---|---|---|---|---|---|---|
| Test Example 1 | 20 | 0 | 0 | ⊙ | ⊙ | ⊙ | Standard |
| Test Example 2 | 15 | 5 | 0 | ⊙ | ○ | ○ | The noodle-making property is hardly influenced. The texture has slightly weak smoothness and a slightly weak elastic feeling as compared with Test Example 1, but is almost good. The salty taste is weaker than that of Test Example 1, but is in an almost good range. |

-continued

| Test Example Number | Amount of salt added | Amount of salt reduced | Amount of potassium lactate added | Noodle-making property | Texture | Salty taste | Comment |
|---|---|---|---|---|---|---|---|
| Test Example 3 | 15 | 5 | 2.5 | ⊙ | ⊙○ | ⊙○ | The noodle-making property is equivalent to Test Example 1.<br>The texture has smoothness and an elastic feeling although they are weaker than those of Test Example 1. The texture is good.<br>The salty taste is weaker than that of Test Example 1, but feels stronger than that of Test Example 2. The salty taste is good. |
| Test Example 4 | 15 | 5 | 5 | ⊙ | ⊙ | ⊙ | The noodle-making property, the texture, and the salty taste are all similar to those of Test Example 1. |
| Test Example 5 | 15 | 5 | 7.5 | ⊙ | ⊙ | ⊙○ | The noodle-making property and the texture are almost equivalent to those of Test Example 1. As to the salty taste, harshness due to potassium lactate slightly appears. |
| Test Example 6 | 10 | 10 | 0 | ○ | Δ | Δ | The noodle-making property provides somewhat less noodle extention than Test Example 1. However, the noodle-making property is on a good level.<br>The texture is lacking in smoothness and elastic feeling, and has fluffiness.<br>The salty taste is also weaker than that of Test Example 1, and feels unsatisfactory. |
| Test Example 7 | 10 | 10 | 5 | ⊙○ | ⊙○ | ○ | The noodles extend slightly less than those of Test Example 1. However, the noodle-making property is better than that of Test Example 6.<br>The texture is slightly weak in smoothness and elasticity, however, the texture is good.<br>The salty taste is weaker than that of Test Example 1, but feels apparently stronger than that of Test Example 6, and is good. |
| Test Example 8 | 10 | 10 | 7.5 | ⊙ | ⊙ | ⊙○ | The noodle-making property is equivalent to that of Test Example 1.<br>The texture has smoothness and elasticity, and is thus very good.<br>The salty taste is a little weaker than that of Test Example 1, but is good. |
| Test Example 9 | 10 | 10 | 10 | ⊙ | ⊙ | ⊙ | The noodle-making property is equivalent to that of Test Example 1.<br>The texture has smoothness and elasticity, and is very good.<br>The salty taste feels equivalent to that of Test Example 1, but feels slightly undurable. |
| Test Example 10 | 10 | 10 | 15 | ⊙ | ⊙ | ⊙○ | The noodle-making property is equivalent to that of Test Example 1.<br>The texture has smoothness and elasticity, and is also very good.<br>The salty taste feels equivalent or superior to that of Test Example 1, however, feels slightly harsh as aftertaste. |
| Test Example 11 | 5 | 15 | 0 | ○Δ | ΔX | ΔX | The noodle-making property allows noodle making, however, noodles extends poorly and are brittle since the surface of the noodles becomes dry.<br>The texture is lacking in smoothness and elasticity, with significant fluffiness.<br>The salty taste is also considerably weaker than that of Test Example 1. |
| Test Example 12 | 5 | 15 | 7.5 | ⊙○ | ○ | ○ | The noodles are extendable, their surface is not dry, and the noodle-making property is good.<br>The texture has smoothness, and the fluffiness is suppressed as compared with Test Example 11. The texture is also almost good.<br>The salty taste is weak as compared with Test Example 1, however, the salty taste is almost good. |
| Test Example 13 | 5 | 15 | 15 | ⊙ | ⊙○ | ⊙○ | The noodle-making property is equivalent to that of Test Example 1.<br>The texture has slightly weak elasticity as compared with Test Example 1, however, the texture is good.<br>As to the salty taste, the initial taste is felt equivalent to Test Example 1, but the taste does not last. |

-continued

| Test Example Number | Amount of salt added | Amount of salt reduced | Amount of potassium lactate added | Noodle-making property | Texture | Salty taste | Comment |
|---|---|---|---|---|---|---|---|
| Test Example 14 | 5 | 15 | 22.5 | ⊙ | ⊙○ | ○ | The noodle-making property is equivalent to that of Test Example 1. The texture has slightly weaker elasticity than that of Test Example 1, however, the texture is good. As to the salty taste, the initial taste is felt equivalently to Test Example 1, but the taste does not last apparently, and the salty taste feels harsh as aftertaste. |

<Experiment 2: Examination of Other Noodles>

Test Example 15

Main raw material powder comprising 850 g of wheat flour and 150 g of acetylated tapioca starch, and 5 g of powder of calcium carbonate as a sub material were subjected to powder mixture. Kneading water containing 15 g of salt, 10 g of a kansui preparation (potassium carbonate: sodium carbonate=6:4), 1 g of sodium phosphate, 1 g of polyphosphate, and 0.2 g of marigold dye dissolved in 400 g of water was added thereto. The mixture was mixed with a normal pressure mixer for 15 minutes to manufacture noodle dough (dough).

The manufactured dough was formed into crude noodle belts with a roll, and the crude noodle belts were compounded to manufacture a noodle belt. The manufactured noodle belt was rolled out with a roll so that the final noodle belt thickness was 1.5 mm. The noodle belt was cut into noodle strings with a #16 round cutting blade roller.

Subsequently, the noodle strings were steamed for 2 minutes and 30 seconds in a steam chamber in which saturated steam at 270 kg/h was introduced, and the noodle strings was gelatinized.

The gelatinized noodle strings were dipped into liquid seasoning obtained by dissolving 45 g of salt, 5 g of gum arabic and 3 g of sodium glutamate in water, and diluting up the mixture to 1 L for 5 seconds, cut into lengths of about 30 cm and then divided into 145-g portions which are each for one meal. A retainer was filled therewith, and the noodle strings were dried at 85° C. for 50 minutes to obtain a non-fried Chinese noodle sample.

Test Example 16

A non-fried Chinese noodle sample was obtained in the same way as in Test Example 15 except that salt added to kneading water was 10 g, and potassium lactate was 6.4 g (equivalent to 5 g of potassium lactate).

Test Example 17

Main raw material powder comprising 700 g of wheat flour and 300 g of buckwheat flour was mixed with kneading water containing 20 g of salt, 4 g of sodium phosphate, and 2.5 g polyphosphate dissolved in 360 g of water in a normal pressure mixer for 15 minutes to manufacture noodle dough (dough).

The manufactured dough was formed into crude noodle belts with a roll, and the crude noodle belts were compounded to manufacture a noodle belt. The manufactured noodle belt was rolled out with a roll so that the final noodle belt thickness was 1.0 mm. The noodle belt was cut into noodle strings with a #20 square cutting blade roller.

Subsequently, the noodle strings were steamed for 2 minutes in a steam chamber in which saturated steam at 240 kg/h was introduced, and the noodle strings was gelatinized.

The gelatinized noodle strings were dipped into liquid seasoning obtained by dissolving 10 g of salt and 1 g of citric acid in water and diluting up the mixture to 1 L, cut into lengths of about 30 cm and then divided into 100-g portions which are each for one meal. A retainer for fries (container) was filled therewith, and the noodle strings were dried at 150° C. for 2 minutes and 10 seconds to obtain a fried noodle sample (soba) with a moisture content of 3% by weight.

Test Example 18

A fried noodle sample (soba) was obtained in the same way as in Test Example 17 except that salt added to kneading water was 16 g, and 3.8 g of 78% potassium lactate (equivalent to 3 g of potassium lactate) was added.

The samples obtained in Experiment 2 were evaluated in the same way as in Experiment 1. The following Table 2 shows the evaluation results. As to the cooking method, in Test Examples 15 and 16, a non-fried Chinese noodle sample was placed into a pot filled with 500 ml of boiling water, the sample was boiled and cooked in the pot for 5 minutes, the flame was turned off, and the sample was poured into a bowl and eaten for evaluation. Test Examples 17 and 18 were carried out in the same way as in Experiment 1.

TABLE 1

| Test Example Number | Amount of salt added | Amount of salt reduced | Amount of potassium lactate added | Noodle-making property | Texture | Salty taste | Comment |
|---|---|---|---|---|---|---|---|
| Test Example 15 | 15 | 0 | 0 | ⊙ | ⊙ | ⊙ | Standard |

TABLE 1-continued

| Test Example Number | Amount of salt added | Amount of salt reduced | Amount of potassium lactate added | Noodle-making property | Texture | Salty taste | Comment |
|---|---|---|---|---|---|---|---|
| Test Example 16 | 10 | 5 | 5 | ⊙ | ⊙ | ⊙ | All of the noodle-making property, the texture, and the salty taste are almost equivalent to those of Test Example 15. |
| Test Example 17 | 20 | 0 | 0 | ⊙ | ⊙ | ⊙ | Standard |
| Test Example 18 | 16 | 4 | 3 | ⊙ | ⊙ | ⊙ | All of the noodle-making property, the texture, and the salty taste are almost equivalent to those of Test Example 17. |

The invention claimed is:

1. A method for manufacturing instant noodles, the method comprising:
   kneading raw materials comprising: main raw material powder, and a sub material, with kneading water, the sub material comprising: salt, and potassium lactate; and
   forming noodle strings; and
   drying the noodle strings,
   wherein the noodle strings optionally are steamed if needed to be gelatinized, before the drying of the noodle strings,
   the salt is common salt and is added to the kneading water,
   an amount of the salt in the sub material in the presence of potassium lactate therein is in a range from 0.5 to 1.6% by weight relative to an amount of the main raw material powder,
   the amount of the salt in the sub material is reduced from an amount of the salt when no potassium lactate is present in a sub material, by replacing the salt with potassium lactate at a ratio of 1 g of the salt relative to from 0.5 to 1.5 g of potassium lactate,
   the reduced amount of the salt from the amount of the salt when no potassium lactate is present in a sub material is in a range from 0.4 to 1.5% by weight relative to the amount of the main raw material powder, and
   wherein from 20 to 50% by weight of a total amount of the salt to be added to the kneading water when no potassium lactate is present in a sub material is replaced with potassium lactate.

2. The method for manufacturing instant noodles according to claim 1,
   wherein the instant noodles are fried noodles,
   the drying is performed by dipping the steamed noodle strings into heated frying oil so as to produce the fried noodles, and
   a temperature of the heated frying oil is in a range from 140 to 160° C.

3. The method for manufacturing instant noodles according to claim 1, wherein the instant noodles are non-fried noodles,
   the drying is performed by drying the steamed noodle strings with hot-air drying, high-temperature hot-air drying, superheated steam drying, or microwave drying, so as to produce the non-fried noodles,
   wherein the hot-air drying, the high-temperature hot-air drying, and the superheated steam drying are performed at a temperature in a range from 60 to 150° C.

* * * * *